United States Patent
Volpato et al.

(10) Patent No.: US 7,494,589 B2
(45) Date of Patent: Feb. 24, 2009

(54) INDUSTRIAL PROCESS FOR FOOD LIQUIDS DECONTAMINATION FROM CHEMICAL AND/OR BIOLOGICAL CONTAMINANTS

(75) Inventors: Ivo Volpato, S. Mariano (IT); Bernard Bizzini, Albi (CH); Flavio Veneroni, Correzzana (IT)

(73) Assignee: Dox-Al Italia S.p.A., Correzana (IT)

(*) Notice: Subject to any disclaimer, the term of this patent is extended or adjusted under 35 U.S.C. 154(b) by 288 days.

(21) Appl. No.: 10/518,106

(22) PCT Filed: Jun. 10, 2003

(86) PCT No.: PCT/EP03/06072

§ 371 (c)(1), (2), (4) Date: Dec. 10, 2004

(87) PCT Pub. No.: WO03/103409

PCT Pub. Date: Dec. 18, 2003

(65) Prior Publication Data

US 2005/0220936 A1    Oct. 6, 2005

(30) Foreign Application Priority Data

Jun. 10, 2002  (IT) .......................... MI2002A1260

(51) Int. Cl.
*B01D 61/00* (2006.01)
(52) U.S. Cl. ................. 210/638; 210/601; 210/650; 210/651; 210/242.1; 424/278.1; 435/264; 426/11; 426/519; 426/490; 426/491; 426/532
(58) Field of Classification Search ............... 210/638, 210/644, 645, 650, 651, 660, 663, 635, 656, 210/121, 242.1, 601; 426/422, 490, 491, 426/518, 528–532, 535, 11, 519; 435/287.1, 435/288.5, 288.6, 288.7, 264; 436/518–527; 424/278.1
See application file for complete search history.

(56) References Cited

U.S. PATENT DOCUMENTS

| | | | |
|---|---|---|---|
| 4,347,312 A | 8/1982 | Brown et al. | |
| 4,357,311 A | 11/1982 | Schutt | |
| 4,693,985 A | 9/1987 | Degen et al. | |
| 5,038,793 A | 8/1991 | Guirguis | |
| 5,573,921 A | 11/1996 | Manns et al. | |
| 5,868,930 A * | 2/1999 | Kopf | 210/321.75 |
| 5,998,222 A * | 12/1999 | Weimer | 436/518 |
| 6,139,746 A * | 10/2000 | Kopf | 210/635 |
| 6,576,460 B1 * | 6/2003 | Baeumner et al. | 435/287.1 |

FOREIGN PATENT DOCUMENTS

| | | |
|---|---|---|
| EP | 0246643 | 11/1987 |
| EP | 0892271 | 1/1999 |
| IT | 01313701 | 12/1999 |
| JP | 5249116 | 9/1993 |
| WO | WO 96/27614 | 9/1996 |

OTHER PUBLICATIONS

XP-002223968 Abouized M M et al. "Simultaneous Screening of Fumonisin B1, Aflatoxin B1, and Zearaleone by line Immunoblot: A Computer-Assisted Multianalyte Assay System" Journal of the AOAC International, 1994, vol. 77 pp. 495-500.

XP-002223970 Darquea, D. et al. "Development and Characterization of a Bioselective Adsorption Matrix for Removal of Bacillus Cereus Spores rrom Buffer and Milk." Lebensmittel-Wissenschaft und Technologie, 1997, vol. 30, pp. 786-792.

XP-002223990 Jung, R. et al. "Strip Elisa for Detection of Staphylococcal Enterotoxins in Culture Supernatants and Foods." Food and Agricultual Immunology, 1193, vol. 5, pp. 107-144, undated.

XP002223969 Losso J N et al. "Removal of Bovine Serum Albumin from Cow's Milk Using Chicken Egg-yolk Antibodies Immobilized on Chitosan Gel." Food and Agricultual Immunology, 1998, vol. 10, pp. 47-56.

Baudrimont, et al. "Effect of Superoxide Dismutase and Catalase on the Nephrotoxicity Induced by Subchronical Adminstration of Ochratoxin in Rats" Toxicology 89, 1994, pp. 101-111.

Bizzini, et al. "Immunochimie et Mecanisme D'action de la Toxine Tetanique" Bulletin de L'institut Pasteur, 1974, 72, pp. 177-219.

Demetriou, J.A., "Progesterone" in Meth., in Clin. Chem., 1987, p. 253, A.J. Pesce and L.A. Kaplan, Eds., C.V. Mosby Publisher, St. Louis, USA.

De Saeger, S. et al. "Dipstick Enzyme Immunoassay to Detect *Fusarium* T-2 Toxin in Wheat" Applied and Enviornmental Microbiology, Jun. 1996, vol. 62, No. 6, pp. 1880-1884.

(Continued)

*Primary Examiner*—Joseph W Drodge
(74) *Attorney, Agent, or Firm*—Gifford, Krass, Sprinkle, Anderson & Citkowski, P.C.

(57) ABSTRACT

Procedure for the decontamination of a food liquid from one or more chemical and/or biological contaminants, based on the contact of said liquid with at least a biocompatible membrane, to which antibodies specific for said contaminants are covalently bound.

17 Claims, No Drawings

OTHER PUBLICATIONS

Fuchs, S. and Sela, M., "Immunoadsorbents", Immunochemistry, vol. 1., 1978, Chpt. 10, Ed. D.M. Weir, Blackwell Sci. Publ., Oxford.

Heide, K., and Schwick, H.G., "Salt Fractionation of Immunoglobins, in Immunochemistry", vol. 1, 1978, Chpt. 7, Ed. D.M. Weir, Blackwell, Sci., Publ., Oxford.

Johnstone, A., and Thorpe, R. "Immunochemistry in Practice", 1982, 27-30, Blackwell Sci. Publ. Oxford.

Lamplugh, S.M., "Comparison of Three Methods for the Extraction of Aflatoxins From Human Serum in Combination With a High-Performance Liquid Chromatographic Assay", J. Chromatogr., 1983, 273, 442.

Raynaud, M. et al. "Croissance et Toxinogenese", Ann. Inst. Pasteur, 1955, 88, 24.

Stahr, H.M., "Atrazine in Tissue, Blood, and Urine: Gas-Liquid Chromatogrpahy", Analytical Methods in Toxicology, 1991, pp. 181-182., John Wiley and Sons, NY.

Stahr, H.M., "Carbamates Gas-Liquid or Thin Layer Chromotopography", Analytical Methods in Toxicology, 1991, pp. 157-160, John Wiley and Sons, NY.

Usleber, E. et al., "Direct Enzyme Immunoassay in Microtitration Plate and Test Strip Format for the Detection of Saxitoxin in Shellfish", Letters in Applied Microbiology, 1991, 13, pp. 275-277.

Usleber, E. et al., "Two Formats of Enzyme Immunoassay for the Detection of Saxitoxin and Other Paralytic Shellfish Poisoning Toxins," Food Additives and Contaminants, 1995, vol. 12, No. 3, pp. 405-413.

* cited by examiner

INDUSTRIAL PROCESS FOR FOOD LIQUIDS DECONTAMINATION FROM CHEMICAL AND/OR BIOLOGICAL CONTAMINANTS

PRIOR ART

Food liquids, e.g. wine, milk, fruit and vegetables juices, beer, and water may contain chemical or biological contaminants.

Out of the chemical contaminants, the most common are:
parasiticides, weed-killers, pesticides: they may reach the food from the soil through the fruit or vegetables used as starting materials or, as concerns milk, through the aliments introduced with the diet in the producing animal;
drugs, hormones and metabolites thereof: they are originated, in the milk production cycle, from the uncontrolled treatment of the animal or, as concerns hormones, from the physiological period of milking;
process contaminants: they derive e.g. from the malolactic fermentation of wine.

The most frequent biological contaminants are toxins, e.g. of bacterial or mycotic origin, which may reach the food through the fruit or vegetables used as starting materials or may be generated during the food liquid preparation process.

The amount of the possible contaminations and difficulty in monitoring the events at their origin make the problem of food liquids contamination of topical interest as it is of paramount importance for the control of the consumers' risk factors.

For example, the nephrotoxicity induced by mycotic toxins is well known (I. Baudrimont, A. M. Betbeder, A. Gharbi, A. Pfohl-Leszkowicz, G. Dirheimer and E. E. Creppy, Effect of superoxide dismutase and catalase on the nephrotoxicity induced by administration of ochratoxin A in rats, Toxicology, 1994, 89(2), 101). So are the problems entailed by the pharmacoresistance following an uncontrolled use of antibiotics, and the effects (especially on populations at risk) of the presence of pharmacologically active metabolites, such as glucocorticoids and biogenic amines in food.

Therefore, there is an urgent need for techniques allowing a total decontamination of food liquids from all aforementioned contaminants.

So far, said decontamination has been carried out by techniques exploiting the physical adsorption of contaminants by inert substrates, such as active carbon, gel, cellulose and derivatives thereof. However, the use of said techniques is limited as it effects an insufficient decontamination and, being based on nonspecific physical processes, removes substances, e.g. pigments, flavouring agents or even nutrients, which substantially determine the food primary characteristics.

Patent application M199A002622 by the Applicant describes an innovative and ameliorative decontamination technique envisaging the complexation (elimination) of the toxic contaminants present in the food liquid by the corresponding insolubilised specific polyclonal antibodies.

In particular, immunoglubulins specific for the contaminant to be eliminated are insolubilised by adhesion to glass or plastic microspheres or to magnetised metal microspheres, optionally coated with chemically derivatizable polymers and added to the contaminated liquid in precise and predetermined molar concentration ratios. After incubation, the toxic residues-immunoglobulins complexes that form are eliminated by filtration.

However, some drawbacks are inherent in the industrial application of said technique:

a. the microspheres used as a means of immobilisation and utilisation of decontaminants, are precipitable. Therefore, the food liquid must be vigorously stirred. It follows that the process, which, moreover, is not always technically applicable, involves considerable modification costs;
b. since the surface of contact between the immunoglobulins and the liquid to be decontaminated is small, the decontamination time is relatively long and not always compatible with the production processes;
c. since the antibody is bound to the solid support by adhesion, i.e. through a weak bond, it tends to be detached therefrom in considerable amounts during the washing and reactivation steps, carried out to allow its use in successive processes. It follows that it cannot be reused as many times as needed not to significantly affect the production costs;
d. the liquid filtration required at the end of the process determines an increase in production times and costs.

Substrates of a different nature, e.g. membranes obtained in nitrocellulose or other physically reactive polymers, whereto immunoglobulins are bound by adhesion, are known and especially used in clinical biochemistry for diagnostic purposes.

Recently, they have been also used in the detection of mycotoxins in foods and biological fluids. By way of example, mention is made of:

E. Usleber, E. Schneider and G. Terplan, Direct enzyme immunoassay in microtitration plate and test strip format for the detection of saxitoxin in shellfish, Left. in Appl. Microbiol., 1991, 13, 275.

S. De Saeger and C. Van. Peteghem, Dipstick Enzyme Immunoassay to Detect Fusarium T-2 Toxin in Weath, Appl. Environ. Microbiol., 1996, 62(6), 1880.

E. Usleber, E. Schneider, G. Terplan and M. V. Laycock, Two formats of enzyme immunoassay for the detection of saxitoxin and other paralytic shellfish poisoning toxins, Food Additiv. and Contaminants, 1995, 12 (3), 405.

SUMMARY

It has surprisingly been found that biocompatible membranes, preferably of a polymeric nature, to which antibodies specific for contaminants are covalently bound, are advantageously used in the decontamination of food liquids. They allow to solve the problems entailed by the decontamination techniques known in the art and bring about surprising results in terms of efficiency and application simplicity.

Therefore, the present invention refers to a new procedure for the decontamination of food liquids, based on the use of the aforesaid membranes.

DETAILED DESCRIPTION OF THE INVENTION

It is an object of the present invention to provide a process for food liquid decontamination from one or more chemical and/or biological contaminants, which consists in the contact of said liquid with at least a biocompatible membrane, to whose surface antibodies specific for said contaminants are covalently bound.

It is a further object of the present invention to provide a membrane for the decontamination of food liquids from chemical and/or biological contaminants, to be used in the process of the invention. Said membrane consists of a biocompatible material and is characterised by the fact that antibodies specific for said contaminants are covalently bound to it or to its surface.

According to a particularly preferred embodiment of the invention, the membranes, preferably in the form of strips, are immersed in the liquid to be decontaminated. Said strips are kept taut in the liquid by some floats, e.g. hollow plastic balls, at one end and by some balance weights at the other end. The membranes are kept immersed in the liquid to be decontaminated for a period preferably ranging from 1 to 24 hrs, depending on the contaminant concentration, on the temperature and on the presence or absence of stirring. The liquid decontamination is more rapid under stirring. According to the present invention, the food liquid can be completely and rapidly decontaminated also without stirring. This is particularly advantageous when the stirring of the liquid mass to be decontaminated is unadvisable or involves excessive costs.

Furthermore, the decontamination is more rapid at room temperature than at temperatures below room temperature. In fact, at room temperature, the decontamination preferably takes from 1 to 6 hrs.

Once the treatment has been completed, the membrane/s of the invention is/are separated from the liquid by simple removal, i.e. without the separation procedures, such as filtration, required by techniques known in the art. This brings about considerable advantages in terms of cost and safety.

The food liquids that can be decontaminated by the procedure according to the present invention are, e.g. wine, milk, fruit and vegetables juices, beer and water.

According to a particularly preferred embodiment of the present invention, the membrane/s consists/consist of a biocompatible polymer that is chemically conjugated with antibodies. The biocompatible polymer is synthetic, semi-synthetic or natural and is suitable for the preparation of a membrane with a mechanical resistance sufficient for the use of same in the claimed procedure.

Membranes are preferably in the form of woven or non-woven fabric

The polymer is preferably selected from the group consisting of nylon and derivatives thereof, cellulose derivatives and polyacrylates, nitrocellulose and nylon 66 being particularly preferred. Membranes can consist of only one of these materials or being prepared with a mixture of them (e.g. alcantara consists in 60% polyester and 40% polyurethane). Antibodies specific for the contaminants to be eliminated are immobilised on the membranes of the invention. Preferably, said antibodies are polyclonal antibodies, obtained by immunisation of medium-large sized animals according to methods known in the art (cf. A. Johnstone and Thorpe, Immunochemistry in Practice, 1982, 27-30, Blackwell Sci. Publ., Oxford).

The antibodies are immobilised on the membranes of the invention by chemical conjugation reactions known in the art, specifically optimised for that purpose.

The chemical conjugation with the antibody preferably occurs through a linker, whose function is to reduce the steric hindrance and, consequently, favour the antibody conjugation with the membrane and the interaction between the antibody and the contaminant/s. Furthermore, the conjugation through a linker increases the density of the antibodies on the membrane surface. These properties allow a more efficient decontamination.

Diamino-monocarboxylic amino acids or monoamino-dicarboxylic amino acids can be used as linker, particularly Arginine, Lysine, Aspartic Acid and Glutamic Acid.

Another particularly preferred linker is the following:

—CH2-CH2-SO2-CH2-CH2-NH—(CH2)4-
N=CH—(CH2)3-CH=O

The process of the invention allows the elimination from a liquid food of any contaminant against which specific antibodies can be produced.

In particular, the aforesaid contaminants may be either of a chemical nature, such as for example parasiticides, weed-killers, pesticides, drugs and metabolites thereof, hormones and metabolites thereof, and undesired substances that originate during the food liquid production process, or of a biological nature, such as for example toxins.

In particular, as described in detail in the experimental part that follows, the procedure of the invention is very effective for the elimination of the following contaminants from food liquids:

atrazine, aflatoxin, ochratoxin, fumonisine, cadaverine, putresceine, urethane, progesterone and inactivated *salmonella*.

The process according to the present invention, which uses membranes whereto antibodies directed against the various contaminants are bound, allows the decontamination of a liquid from several contaminants in a single operation.

Therefore, in the decontamination procedure according to the invention, one or more membranes per contaminant is/are used.

The total surface of the membrane/s per contaminant is such that the molar ratio of the immobilised antibody to the contaminant recognized by the antibody is preferably ≧1. According to a particularly preferred embodiment, said ratio ranges from 1 to 5 and preferably from 1 to 2.

Compared with the techniques for food liquid decontamination known in the art, the procedure of the invention offers many and unexpected advantages.

In particular, as demonstrated by the following examples, the procedure of the invention is of easier application since it does not require any stirring of the liquid. Furthermore, said procedure brings about a complete decontamination within a much shorter time than necessary for the procedure described in patent application MI99A002622, which—for the decontamination—utilises antibodies immobilised on microspheres. As shown in more details in Example 18, a further advantage of the present procedure is that the claimed membranes may be regenerated by contaminant removal by washing, e.g. with 0.1 N HCl, and may be re-used in successive decontamination procedures, without losing their decontamination power. That brings about considerable advantages in terms of process costs.

EXAMPLE 1

Preparation of atrazine-BSA (Bovine Serum Albumin) conjugate

1. Diazoderivative Preparation 10 mg Atrazine ($4.6 \times 10^{-6}$ mol) was added with 10 µl 1N HCl ($5 \times 10$ mol). The resulting mixture was brought to the desired consistency by means of a spatula, poured into a test tube, which was placed into boiling water, and added with 900 µl distilled water. The resulting atrazine.HCl solution was added with 0.5 ml 1N HCl and cooled in an ice bath. Once 1 mg NaBr was added, 260 µl NaNO$_2$ cold solution in a concentration of 1 mg/ml (260 mg; $4.4 \times 10^{-6}$ mol) was added dropwise under stirring. Stirring was continued for 1 hr in ice to give the captioned diazoderivative.

2. Conjugation with BSA

A BSA solution in a concentration of 8.4 mg/ml in 0.1M borate buffer, pH 9, was added dropwise under stirring over a period of 15 min with the diazoderivative solution prepared as per point 1; the pH was maintained constant by addition of 1N NaOH. The mixture was caused to react in ice for 2 hrs and dialysed against PBS (Phosphate Buffered Saline).

EXAMPLE 2

Preparation of aflatoxin-BSA conjugate

1. Preparation of Benzidine bis-diazoderivative

Benzidine.2HCl (26 mg) was dissolved in 4.5 ml 0.2N HCl, added with 18 mg $NaNO_2$ dissolved in 0.5 ml distilled water. The reaction was carried out in an ice bath under stirring for 1 hr; an orange colour immediately developed.

2. Conjugation with BSA

A BSA solution (50 μl) in a concentration of 10 mg/ml in 0.16M borate buffer-1.3M NaCl, pH=9, was added with 50 μg lyophilised ochratoxin. The resulting mixture was added with a mixture consisting of 17 μl bis-diazo-benzidine solution as per point 1 and 33 μl borate buffer. The colour turned brown and the reaction was continued at 4° C. for a period of 2 hrs under desultory stirring. The reaction mixture was dialysed against PBS.

EXAMPLE 3

Preparation of ochratoxin-BSA conjugate

A BSA solution (30 ml) in a concentration of 10 mg/ml in 0.1M acetate buffer, pH=5.5, was added with 9.32 ml ochratoxin solution in a concentration of 5 mg/ml in 9/1 water/methanol. The mixture was added with 750 mg EDAC (Sigma E1769) and caused to react at room temperature for a period of 2 hrs; during the first 30 min, the pH was controlled every 5 min.

The reaction mixture was dialysed against PBS, pH 7.4, in 10 Kd cut-off tubing.

The conjugation ratio of BSA to ochratoxin was 1:25 by mmoles.

EXAMPLE 4

Preparation of fumonisine-BSA conjugate

1. Preparation of Fumonisine B1-glutaraldehyde-BSA

A solution of BSA (Sigma A7906) (15 ml) containing 1 mg/ml protein in 0.1M PBS, pH 7.4, was dialysed at 4° C. overnight against 200 ml 0.2% glutaraldehyde solution (Sigma G5882). The activated BSA solution was further dialysed against 500 ml PBS (three changes min) to remove excess unreacted glutaraldehyde.

The activated BSA solution was added with 25 mg fumonisine B1 (Sigma F1147) dissolved in 1 ml 0.06M DMSO. The resulting mixture was caused to react under stirring at laboratory temperature for 3 hrs and then at 4° C. overnight, and finally dialysed against PBS.

The conjugate obtained consisted of 0.93 mg BSA and 0.15 mg fumonisine B1/ml.

2. Preparation of fumonisine B1-CDI-BSA

A BSA solution (Sigma A7906) (15 ml) containing 1 mg/ml protein in 0.1M acetate buffer, pH 6.5, was prepared. The mixture was added with 2.5 mg fumonisine B1 dissolved in 1 ml of the said buffer containing DMSO in the final concentration of 0.06 M and, under stirring, with 25 mg powdered carbodiimide (CDI) (Sigma E1769). Stirring was continued at laboratory temperature for 1 hr, while the pH was controlled every 10 min and adjusted to 0.5 as long as necessary. The mixture was caused to react at 4° C. overnight and successively dialysed against PBS to remove excess unreacted reagents.

A conjugate containing 0.93 mg BSA and 0.15 mg fumonisine: B1/ml was obtained.

EXAMPLE 5

Preparation of cadaverine-azo-BSA conjugate

Cadaverine: 1,5-diaminopentene [$H_2N-(CH_2)_5-NH_2$]
Conjugate: $H_2N-(CH_2)_5-N=N$-BSA 1. Preparation of cadaverine mono-diazoderivative The reaction was performed in an ice bath.

Cadaverine dihydrochloride (35 mg; 0.2 mmol)) was dissolved in 5 ml water containing 0.3 mmol HCl and 4 mg NaBr (0.04 mmol).

The solution was slowly added over a period of approx. 10 min, under stirring, with 14.5 mg (0.21 mmol) $NaNO_2$ dissolved in 1 ml icy water.

Once the presence of excess $HNO_2$ was checked with iodine-starch treated paper, the reaction was continued for further 10 min to give [$NH_2-(CH_2)_5-N=N-OH$].

2. Preparation of cadaverine-azo-BSA conjugate

A BSA solution (10 ml) in a concentration of 10 mg/ml in 0.1M borate buffer, pH=9.0, containing 0.13M NaCl was added, under stirring and in an ice bath, with 2 ml cadaverine diazoderivative solution prepared as described above.

The resulting solution was caused to react under desultory stirring at 4° C. for 2 hrs and then dialysed against PBS in 10 Kd cut-off tubing. The pH was then adjusted to 9.0.

The cadaverine/BSA conjugation ratio obtained was 23.5:1.

EXAMPLE 6

Preparation of putresceine-azo-BSA conjugate

The putresceine-azo-BSA immunogen was synthesized as described in Example 6, in the same reaction molar ratios (by multiplying the amount indicated for cadaverine by 0.92).

Owing to structural analogy, the antibodies produced against cadaverine reacted against putresceine to a sufficient extent to bring about the complexation of same.

EXAMPLE 7

Preparation of ethyl-carbamate-N=N-BSA conjugate

1. Ethylcarbamate (Urethane) Diazotisation.

Urethane (35.6 mg; 0.4 mol) was dissolved in 4 ml 0.1N HCl. The solution was cooled in ice, added under stirring with 24.8 mg $NaNO_2$ dissolved in 2 ml icy water under stirring. Stirring was continued for 1 hr in ice.

2. Formation of the Conjugate with BSA

A solution containing 130 mg BSA in 13 ml 0.16M borate buffer-0.13M NaCl, pH=9.0, was cooled in ice and slowly added under stirring with a 1 ml diazo-ethyl-carbamate solution. The resulting solution was caused to react for 2 hrs and then dialysed against the same buffer in 10 kD cut-off tubing.

The ethylcarbamate/BSA ratio obtained was 40:1 by mol.

EXAMPLE 8

Preparation of progesterone-BSA conjugate

1. Progesterone Activation

Progesterone-3(O-carboxymethyl)oxime (60 mg; 0.15 mM) (Sigma P3277) and 37.5 µl (corresponding to 0.15 mM) tri-n-butylamine were dissolved in 1.5 ml dioxane.

The solution was cooled to 8° C., added with 20 µl (0.15 mM) isobutylchlorocarbonate, and caused to react for 35 min.

2. Conjugation with BSA

BSA (Sigma) (210 mg) was solubilised in 5.5 ml water and added with 4 ml dioxane and 240 µl 1 N sodium carbonate.

The mixture was cooled to 8° C., added with the whole activated progesterone solution (the pH was adjusted to 7.5) and caused to react for 30 min. Then, it was added with 25 µl 1N NaOH and caused to react for 4½ hrs.

The solution was dialysed against water overnight.

The pH was brought to 4.5 with 1M HCl. The precipitate that formed was allowed to stand at 4° C., recovered by centrifuging, solubilised in 10 ml water, while the pH was adjusted to 7.0 with 1M sodium carbonate, and finally purified by successive passages over acetone (15 ml/passage) at acid pH.

EXAMPLE 9

*Salmonella* Inactivation.

For the production of antibodies against *salmonella*, the animal was sensitized using the relevant antigen.

The antigen was produced from the *salmonella enteritidis* pathogen taken from a clinico-pathological material and grown by fermentative route on a medium specific for salmonellas.

The antigen was extracted by bacterial lysis according to methods known (M. Raynaud, A. Turpin, R. Mangalo and B. Bizzini, Croissance et toxinogenese, Ann. Inst. Pasteur, 1955, 88, 24).

The purification and transformation of same into an immunogen were carried out by traditional methods (B. Bizzini, A. Turpin and M. Raynaud, Bull. Inst. Pasteur, 1974, 72, 177).

EXAMPLE 10

Animals Immunisation for Polyclonal Antibodies Production

The polyclonal antibodies corresponding to the various immunogens synthesised in Examples 1 to 9 were produced in the sheep according to a method already described (cf. A. Johnstone and R. Thorpe, Immunochemistry in Practice, 1982, 27-30, Blackwell Sci. Publ., Oxford).

In particular, the immunisation protocol adopted was as follows:

a. animal sensitisation treatment by subcutaneous (sc) administration of 10 mg immunogen/animal, suspended in 2 ml of a 1:1 (v/v) mixture of PBS, pH 7.4, and Freund complete adjuvant (Sigma F5881); the sc injection was administered in five different points (0.4 ml/point) of the animal dorsal region;

b. booster treatment by intramuscular (im) injection (in the thigh) of 2.5 mg immunogen/animal, suspended in 1 ml of a 1:1 (v/v) mixture of PBS, pH 7.4, and Freund's incomplete adjuvant (Sigma F5506);

c. booster treatments at thirty-day intervals, performed under the same experimental conditions as described above until antibody response positivity.

The antibody response positivity was assayed by the ELISA method: the microplate well was coated with a control immunogen, i.e. an immunogen of the same hapten conjugated with a protein (e.g. HSA; OVA) heterologous in respect of that used for the synthesis of the test immunogen (product administered). The sensitivity and specificity of the antibodies produced were analysed using a sheep antibody anti-antibody conjugated with enzyme HRP (Horseradish Peroxidase Sigma A3415);

d. the blood for antibodies purification was taken from the animal jugular on the 15th day following each booster.

EXAMPLE 11

Specific Immunoglobulins (IgGs) Purification

The serum was collected by animal blood centrifugation at 3,000 rpm for 15 min; immunoglobulins were precipitated therefrom by treatment with an ammonium sulphate saturated solution as described in literature (K. Heide and H. G. Schwick, Salt fractionation of immunoglobulins, in Immunochemistry, vol. 1, 1978, chapter 7, Ed. D. M. Weir, Blackwell Sci. Publ., Oxford).

Excess salts were removed by dialysis against PBS, pH 7.4, in 10 kD cut-off tubing.

The IgGs specific for the hapten (antigen) were separated from the total immunoglobulins by affinity chromatography on Sepharose 4B, activated with the specific immunogen, as described in literature (S. Fuchs and M. Sela, Immunoadsorbents, Immunochemistry, vol. 1, 1978, chapter 10, Ed. D. M. Weir, Blackwell Sci. Publ., Oxford).

EXAMPLE 12

Specific IgGs Immobilisation on Nitrocellulose Substrate (Sheet)

1. Nitrocellulose Activation

Reaction scheme:

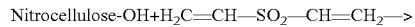

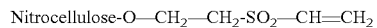

Divinylsulfone (DVS—Sigma V3700) (10 ml) was dissolved in 20 ml dimethylformamide and 170 ml 0.5M $NaHCO_3/Na_2CO_3$ buffer, pH 10. The nitrocellulose sheet was immersed in said solution where it was kept at 21° C. for 10 min, rinsed with distilled water and dried.

The resulting nitrocellulose sheet could be preserved at 4° C. in the dry state for one month at least.

2. Linker Attack to Activated Nitrocellulose

The purpose of said attack is to eliminate the steric hindrance to immunoglobulins attack.

Reaction scheme:

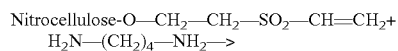

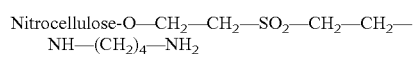

The activated nitrocellulose sheet prepared as described above was immersed in a 1% (w/v) water solution of 1,4-diaminobutane (Sigma P7505) at 21° C. for 30 min, removed therefrom and washed with distilled water.

3. Immunoglobulins Binding to Cellulose.

Immunoglubulins were bound to the nitrocellulose treated as described above by to one of the two following techniques:

3a) IgGs Periodic Oxidation and Binding to the $NH_2$ Group of the Linker 10 ml of an IgG solution (20 mg/mil) in 0.1M citric acid/Na citrate buffer, pH 5.0, was heated to 37° C. and added with a sodium metaperiodate solution ($NaIO_4$, 30 mg/ml water) in an IgG/sodium metaperiodate molar ratio equal to 1:15.

The oxidation was carried out at 37° C. for 5 min, under stirring, sheltered from light, and discontinued by addition of ethylene glycol (Sigma E9129) in a final concentration of 0.01 M.

The linked nitrocellulose sheet, prepared as per point 2, was immersed in 40 ml 1M $Na_2CO_3/NaHCO_3$ buffer, pH 10.0, and added with the solution of oxidised IgGs. The reaction was carried out at 4° C. overnight.

The pH was adjusted to 6.0 by addition of 1M $NaH_2PO_4$. Then, a fresh 0.26M $NaBH_4$ solution (10 mg/ml) was added to a final concentration of 0.001M. The reduction reaction was carried out at room temperature for 30 min.

The nitrocellulose sheet was washed with PBS, pH 7.4, and dried.

3b) Introduction of Aldehydic Groups on Linked Nitrocellulose and IgGs Immobilisation Reaction scheme:

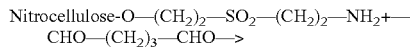
Nitrocellulose-O—$(CH_2)_2$—$SO_2$—$(CH_2)_2$—$NH_2$+ CHO—$(CH_2)_3$—CHO—>

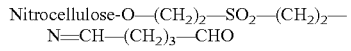
Nitrocellulose-O—$(CH_2)_2$—$SO_2$—$(CH_2)_2$— N=CH—$(CH_2)_3$—CHO

The nitrocellulose-$NH_2$ sheet prepared as per point 2 was immersed in a 1% (v/v) glutaraldehyde solution in 0.5M $NaHCO_3/Na_2CO_3$, pH 10, where it was kept at 21° C. for 15 min, washed with distilled water and dried.

The resulting nitrocellulose sheet could be preserved at 4° C. in the dry state for one month, without any reactivity loss.

The nitrocellulose-CHO sheet was immersed in 100 ml IgGs solution in 0.5M $NaHCO_3/Na_2CO_3$ buffer, pH=10.0, where it was kept at 4° C. overnight.

The sheet was rinsed in PBS, pH 7.4, and immersed in a fresh solution of 0.001 M $NaBH_4$ in PBS, pH 6.0. The reduction reaction was carried out at laboratory temperature for 30 min. Then, the sheet was rinsed in PBS, pH 7.4.

EXAMPLE 13

Specific IgGs Immobilisation of on a Nylon Substrate (Fabric)

Scheme No. 1

1. Nylon Activation

A nylon 6,6[poly(N,N'-hexamethylene adipin diamide Fluka 74712] fabric was immersed in 3.5M HCl where it was kept for 24 hrs, and washed with distilled water.

Nylon activation by —$NH_2$ and —COOH reactive groups exposure was obtained.

2. Conjugation with Immunoglobulins

The immunoglobulins were conjugated with HCl-pretreated nylon according to three different procedures:

2a)

Reaction scheme:

Nylon-COOH+CMC->Nylon-COCMC

The —$NH_2$ groups were blocked by 1-min treatment with concentrated acetic anhydride. The fabric was washed with distilled water first and then with 0.1M carbonate buffer, pH 9.5, and finally rinsed in PBS.

The —COOH groups were activated by treatment of the material pretreated as described above with 4% 1-cyclohexyl-3-(2-morpholinoethyl)-carbodiimide meta-p-toluene-sulfonate (CMC) in water at room temperature for 10 min.

IgGs and nylon-CMC were caused to react in PBS at room temperature for 2 hrs and then at 4° C. overnight.

The fabric was washed with PBS, treated with a 2% (w/v) OVA (ovoalbumin) solution in PBS at room temperature, further washed with PBS-Tween 20 (0.05%), and finally dried.

2b)

Reaction scheme:

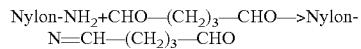
Nylon-$NH_2$+CHO—$(CH_2)_3$—CHO—>Nylon-N=CH—$(CH_2)_3$—CHO

The nylon fabric, preactivated with HCl, was treated with a 2% glutaraldehyde solution in distilled water at room temperature for 2 hrs.

After washing with distilled water, the nylon fabric was treated at room temperature for 4 hrs with an IgG solution in PBS in a 1 mg/ml Concentration. The fabric was then washed with PBS, treated with a 2% (w/v) OVA solution in PBS for 1 hr, further washed at room temperature with PBS-Tween 20 (0.05%), and dried.

2c)

Reaction scheme:

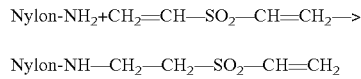
Nylon-$NH_2$+$CH_2$=CH—$SO_2$—CH=$CH_2$—>

Nylon-NH—$CH_2$—$CH_2$—$SO_2$—CH=$CH_2$

The nylon fabric pretreated with HCl for reactive groups exposure, was immersed in 10 ml divinylsulfone (DVS) dissolved in 20 ml dimethylformamide (DMF) and 170 ml 0.5M $NaHCO_3/Na_2CO_3$ buffer, pH 9.0, where it was kept at 21° C. for 1 hr, and washed with distilled water.

100 mg IgGs was dissolved in 20-ml 0.5M $NaHCO3/Na_2CO_3$ buffer, pH 9.0. The nylon-DVS fabric was immersed in said solution where it was kept at room temperature overnight.

Once the reaction was completed, nylon was rinsed with PBS and dried.

EXAMPLE 14

Wine Decontamination from Ochratoxin.

The aim of the experiment was to analyse, in parallel, the complexation (elimination) capacity—and relevant rate—of anti-ochratoxin-specific immunoglobulins (IgGs) for wine decontamination from the toxin. The IgGs were used in the following forms:

a. free—as are, not bound to any support;
b. bound to microspheres made of glass containing primary aminic groups (Glass-aminopropyl-Sigma G4643-200/400 mesh);
c. bound to nylon fabric according to the present invention.

Immunoglobulins IgGs were bound to the glass microspheres according to the following reaction scheme:

5 mg anti-ochratoxin specific IgGs was diluted in 2 ml 0.01M acetate buffer, pH 5.5, and dialysed against said buffer (purification salts removal).

The solution was put in an ice bath, added with 53.5 mg $NaIO_4$, caused to react under stirring for 20 min, sheltered from light, added with 40 µl ethylene glycol, caused to react for 5 min., and dialysed against 0.1M $Na_2CO_3/NaHCO_3$ buffer, pH 9.5.

The solution, taken up and brought to 10 ml volume with said buffer, was added with 1 g microspheres-$NH_2$ and caused to react at room temperature overnight.

The microspheres suspension was added with 800 µl $NaBH_4$ (4 mg/ml) solution and caused to react at laboratory temperature for 2 hrs.

The microspheres conjugated with IgGs were washed with PBS. The following conjugation ratio was obtained: $1.84 \times 10^{-8}$ mol IgG/g microspheres-$NH_2$.

Wine decontamination was performed according to the following experimental procedure.

The wine used was red type because of its high toxin content (up to 0.4 µg/l) according to the state of the art. As revealed by HPLC, the ochratoxin content in 300 l wine was 0.265 µg/l.

The wine was subdivided into six 50 l aliquots, which were treated as follows:

aliquot No. 1: under stirring at 150 rpm, with addition of free anti-ochratoxin IgGs in a ratio of 1 mol IgG:1 mol toxin present;

aliquot No. 2: under stirring at 150 rpm, with addition of free anti-ochratoxin IgGs conjugated with glass microspheres in a ratio of 1 mol IgG:1 mol toxin present;

aliquot No. 3: under stirring at 150 rpm with addition of anti-ochratoxin IgGs conjugated to nylon fabric in a ratio of 1 mol IgG:1 mol toxin present. The fabric used was in the form of strips. Strips were kept in suspension by ping pong balls at one end and kept taut, and anyway free to move in the liquid, by weights (lead sinkers) at the other end.

Aliquots No. 4 (free IgGs), No. 5 (IgGs on glass microspheres) and No. 6 (IgGs on nylon fabric) were treated as described above, except that stirring was performed at 1,000 rpm.

All decontamination experiments were carried out at room temperature.

After 1 h-, 3 h-, and 6 h-contact, a 100 ml quantity was taken from each wine aliquot and the non-sequestered (free) ochratoxin content was determined.

For the toxin content determination in aliquots Nos. 1 and 4 (with addition of free IgGs), the analysis was preceded by a dialysis in 10 Kd cut-off tubing to retain the IgG-ochratoxin complexes present.

The following table shows the results obtained under the aforesaid experimental conditions, expressed as percent abatement of the free toxin concentration in wine (decontamination capacity of the various toxin elimination systems by specific IgGs).

| Method | Stirring at | % wine toxin abatement after | | |
|---|---|---|---|---|
| | | 1 h | 3 h | 6 h |
| Free IgGs | 150 rpm | 75 | 90 | 100 |
| IgGs on glass microspheres | 150 rpm | 54 | 60 | 62 |
| IgGs on nylon | 150 rpm | 95 | 100 | — |
| Free IgGs | 1000 rpm | 84 | 95 | 100 |
| IgGs on glass microspheres | 1000 rpm | 90 | 100 | — |
| IgGs on nylon | 1000 rpm | 100 | — | — |

The results obtained show that:
a. using specific IgGs, wine can be completely decontaminated from ochratoxin;
b. using free IgGs, the time taken to complex the whole toxin is relatively long (probably due to the action of the interfering substances present in wine);
c. using IgGs bound to glass microspheres, a fairly vigorous stir is required to obtain total complexation, likely because, in the absence of or under gentle stirring, the microspheres tend to deposit on the bottom. However, vigorous stirring may be incompatible with the industrial wine-making process;
d. surprisingly, using IgGs conjugated with the fabric, the whole toxin present in wine can be complexed within short times and with low stirring levels completely compatible with the industrial process.

EXAMPLE 15

Wine Decontamination from Biogenic Amines (Putresceine)

The aim of the experiment was to analyse the complexation (elimination) capacity—and relevant rate—of specific immunoglobulins for wine decontamination from biogenic amine, added extemporaneously to wine in predetermined concentrations. The IgGs were used in the following forms:
a. free—as are, not bound to any support;
b. immobilised on glass microspheres (Sigma G4663);
c. immobilised on nylon 6,6 fabric according to the present invention; and operating under different experimental conditions.

Specific IgGs immobilisation on glass microspheres was performed according to the procedure described in Example 14.

The putresceine content in wine was assessed by HPLC according to methods known.

Also in this case, the wine used was red type. The wine was analysed to determine the presence, if any, of biogenic amines, then it was added, under stirring, with putresceine up to a final concentration of 4 mg/l.

Wine decontamination was performed according to the following experimental procedure.

The wine was subdivided into six 50 l aliquots, which were treated as follows:

aliquot. No. 1: allowed to stand (i.e. without stirring) and added with free—(non-immobilised) anti-putresceine IgGs in a ratio of 1 mol IgG to 1 mol amine added;

aliquot No. 2: allowed to stand under the same conditions and added with anti-putresceine IgGs immobilised on glass microspheres in a ratio of 1 mol IgG to 1 mol amine added;

aliquot No. 3: allowed to stand under the same conditions and added with anti-putresceine IgGs immobilised on nylon fabric according to the present invention in a ratio of 1 mol IgG to 1 mol amine added.

Aliquots No. 4 (free IgGs), No. 5 (IgGs immobilised on microspheres) and No. 6 (IgGs immobilised on nylon fabric) were treated as described above, except that stirring at 150 rpm was continued throughout the test.

All decontamination experiments were carried out at room temperature.

After 1 h-, 3 h-, and 6 h-contact, a 100 ml quantity was taken from each wine aliquot and the putresceine content (non-complexed by more or less immobilised specific antibodies) was determined.

For toxin content determination in aliquots Nos. 1 and 4 (treated with free—non-immobilised—IgGs), the analysis was preceded by a dialysis in 100 Kd cut-off tubing to retain the IgG-putresceine complexes present.

The following table shows the results obtained under the aforesaid experimental conditions, expressed as percent abatement of the free biogenic amine concentration in wine (decontamination capacity of the various amine elimination systems by specific IgGs in different forms).

| Method | Stirring | % toxin abatement after | | |
|---|---|---|---|---|
| | | 1 h | 3 h | 6 h |
| Free IgGs | no | 55 | 65 | 80 |
| IgGs on glass microspheres | no | 50 | 55 | 58 |
| IgGs on nylon | no | 75 | 95 | 100 |
| Free IgGs | 150 rpm | 72 | 87 | 100 |
| IgGs on glass microspheres | 150 rpm | 65 | 70 | 74 |
| IgGs on nylon | 150 rpm | 96 | 100 | — |

The results obtained show that:
a. surprisingly, using IgGs immobilised on nylon fabric, food liquids (wine) can be completely decontaminated also when allowed to stand, i.e. without stirring procedures, which might be hardly applicable to production processes;
b. IgGs immobilised on glass microspheres cannot exert their optimum decontamination power because, before total complexation, they tend to deposit on the bottom.

EXAMPLE 16

Wine Decontamination from Carbamates (Ethyl Carbamate or Urethane)

The capacity of IgGs—either free or variously immobilised on inert substrates at different concentration levels—for decontaminating wine from carbamate, added extemporaneously, was evaluated.

To that purpose, the following specific antiurethane immunoglobulins were used:
a. free—not immobilised on any support;
b. immobilised on glass microspheres (Sigma G4643) as described in the preceding examples;
c. immobilised on nylon 6,6 fabric according to the present invention.

The ethyl carbamate (urethane) content was determined by gas chromatography according to the method described in literature (H. M. Stahr, Analytical Methods in Toxicology, 1991, p. 157, John Wiley and Sons, N.Y.).

Wine decontamination was performed according to the following procedure.

A white wine lot was examined to ascertain the presence, if any, of ethyl carbamate: the quantity found equalled 5 µg/l. The wine was further added with ethyl carbamate up to a final concentration of 500 µg/l and then subdivided into four 50 l aliquots, which were treated as follows:
aliquot No. 1: under stirring at 150 rpm, with addition of free—non-immobilised—anti-urethane IgGs in a ratio of 0.5 mol IgG to 1 mol urethane;
aliquot No. 2: under stirring at 150 rpm, with addition, as described in the preceding examples, of anti-urethane IgGs immobilised on nylon fabric, in a ratio of 0.5 mol IgG to 1 mol urethane;
aliquots No. 3 (free IgGs) and No. 4 (IgGs immobilised on nylon fabric) were treated as described above, but in an IgG/urethane molar ratio equal to 1:1.

All decontamination experiments were carried out at room temperature.

After 1 h-, 3 h-, and 6 h-contact, a 100 ml quantity was taken from each wine aliquot and the carbamate content (non-sequestered) in the solution was determined.

Also in this case, the aliquots treated with free (non-immobilised) IgGs had been previously subjected to dialysis to retain the IgG-carbamate complexes.

The following table shows the results obtained under the aforesaid experimental conditions, expressed as percent abatement of the chemical contaminant concentration in wine.

| Method | IgG/carbamate ratio by mol | % carbamate abatement after | | |
|---|---|---|---|---|
| | | 1 h | 3 h | 6 h |
| Free IgGs | 0.5 | 55 | 58 | 68 |
| IgGs on nylon | 0.5 | 74 | 90 | 95 |
| Free IgGs | 1 | 82 | 90 | 96 |
| IgGs on nylon | 1 | 94 | 100 | — |

Considering that each mol of specific antibody can generally complex two antigen mols, the above results prove that the IgGs immobilisation on nylon fabric make IgGs surprisingly bioavailable for antigen binding; a proof is that, already at concentrations close to the theoretical values, the contaminant elimination from wine is almost total.

EXAMPLE 17

Milk Decontamination from Aflatoxin

The aim of the experiment was to analyse the capacity—and relevant rate—of anti-aflatoxin specific-IgGs immobilised on different inert supports for milk decontamination from aflotoxin A1. The IgGs were used in the following forms:
a. anti-aflotoxin specific IgGs Immobilised on glass microspheres according to the procedure described in the preceding examples;
b. the same IgGs immobilised on nylon fabric according to the present invention.

The decontamination experiments were carried out on a sample maintained at 4° C., i.e. at the usual milk preservation temperature.

Decontamination was performed according to the following experimental procedure.

The aflatoxin A1 content in milk was determined by HPLC as known in the art (S. M. Lamplugh, Comparison of three methods for the extraction of aflatoxins from human serum in combination with a high-performance liquid chromatographic assay, J. Chromatogr., 1983, 273, 442). The method was adjusted according to the nature of the sample.

A milk lot was examined to ascertain the presence of toxin, if any. Then the milk was added with aflatoxin up to a final concentration of 0.3 µg/l milk and subdivided into 10 l aliquots, which were treated as follows:
aliquot No. 1: under stirring at 150 rpm, with addition of anti-aflatoxin IgGs immobilised on glass microspheres in a ratio of 1 mol IgG to 1 mol toxin present;

aliquot No. 2: under stirring at 150 rpm, with addition of anti-aflatoxin IgGs immobilised on nylon fabric in a ratio of 1 mol IgG to 1 mol toxin present;

aliquot No. 3: under stirring at 150 rpm, with addition of anti-aflatoxin IgGs immobilised on glass microspheres in a ratio of 2 mol IgG to 1 mol toxin present; aliquot No. 4: under stirring at 150 rpm, with addition of anti-aflatoxin IgGs immobilised on nylon fabric in a ratio of 2 mol IgG to 1 mol toxin present.

In this experiment, it was found it convenient to test higher immunoglobulins concentrations since the immunologic reactions conducted in the cold are significantly slowed down.

After 1 h-, 3 h-, and 6 h-contact, 100 ml aliquots were taken from the milk and the aflatoxin content (non-sequestered by immunoglobulins) was determined.

The following table shows the results obtained under the aforesaid experimental conditions, expressed as percent abatement of the free toxin concentration in milk (decontamination power of the various toxin elimination systems by means of anti-toxin specific IgGs).

| Method | IgG:aflatoxin ratio by mol | % aflatoxin abatement after | | |
|---|---|---|---|---|
| | | 1 h | 3 h | 6 h |
| IgGs on microspheres | 1:1 | 32 | 45 | 52 |
| IgGs on nylon | 1:1 | 65 | 86 | 100 |
| IgGs on microspheres | 2:1 | 55 | 78 | 84 |
| IgGs on nylon | 2:1 | 80 | 100 | — |

The above results prove that the immunoglobulins immobilization on nylon compared with other immobilization systems—secures a surprisingly improved decontamination power. Furthermore, milk contaminants may be totally eliminated by said method also at low temperatures.

EXAMPLE 18

Milk Decontamination from *Salmonella* Antigens

The aim of the experiment was to evaluate the capacity of specific immunoglobulins immobilised on an inert substrate for decontaminating milk from bacterial contaminants as well as the rationality and simplicity of the immobilisation methods in view of a successive application to industrial processes.

A further aim of the experiment was to evaluate the suitability of immobilised IgGs to be re-used, once adequately washed, in successive treatments.

To this end, the analysis of milk decontamination from *salmonella* antigens was conducted with IgGs in the following forms:
a. free—as are, non-immobilised on any support b. immobilized on glass microspheres (Sigma G4643);
c. immobilised on nylon fabric according to the present invention.

Milk decontamination was performed according to the following experimental procedure.

The presence of *salmonella* antigens in the food liquid was assayed by competitive ELISA, with a specific antibody attached to the microplate and analysis of the competition, for antibody bonding, between the antigen present on the sample and the same antigen conjugated with a detecting enzyme (peroxidase).

A milk lot was added with *salmonella* antigens up to a final concentration of 20 μg/l and then subdivided into 10 l aliquots, which were treated as follows:

aliquot No. 1: under stirring at 150 rpm, with addition of free—non-immobilised—*salmonella* anti-antigen specific IgGs in a ratio of 1 mol IgG to 1 mol antigen present;

aliquot No. 2: under stirring at 150 rpm, with addition of anti-antigen specific IgGs immobilised on glass microspheres in a ratio of 1 mol IgG to 1 mol antigen present;

aliquot No. 3 under stirring at 150 rpm, with addition of anti-antigen specific IgGs immobilised on nylon fabric in a ratio of 1 mol IgG to 1 mol antigen present.

All decontamination experiments were carried out at room temperature.

After 3-h contact, the IgGs were removed from the liquid according to the following procedure:

aliquot No. 1 (free IgGs) by filtration through 0.45 μm membrane;

aliquot No. 2 (IgGs on glass microspheres) by filtration through Watmann 1 filter paper;

aliquot No. 3 (IgGs on nylon) by simple removal of the fabric from the liquid.

The antigen residue, if any, in milk was measured.

The results expressed as percent abatement of the antigen concentration in milk (decontamination power of variously immobilised immunoglobulins) are shown in the following table.

| Method | % antigen abatement after 3 h |
|---|---|
| Free IgGs | 80 |
| IgGs on glass microspheres | 72 |
| IgGs on nylon | 100 |

The above results essentially show the decontamination power of IgGs immobilised on nylon fabric in respect of other immobilisation systems.

The glass microspheres or the nylon fabric were regenerated by removal of the contaminant bound to the antibodies through a 30-min treatment with a 0.1N HCl solution under gentle stirring. The fabric or the microspheres were rinsed with PBS and used in successive decontamination processes according to the procedure described above.

No experiment was carried out with non-immobilised IgGs since 'they are hardly' recoverable.

The following table shows the results obtained in successive treatments; they are expressed as percent abatement of milk contamination from *salmonella* antigen.

| Method | % antigen abatement after | | |
|---|---|---|---|
| | 3 treatments | 7 treatms. | 10 treatms. |
| IgGs on glass microsperhes | 67 | 52 | 45 |
| IgGs on nylon | 100 | 100 | 95 |

The results obtained show that the immobilisation on nylon surprisingly gives better results than other immobilisation systems, in terms of decontaminant regeneration and re-use.

It follows that the incidence of the decontamination costs on the product cost is considerably reduced.

EXAMPLE 19

Milk Decontamination from Progesterone

The aim of the experiment was to evaluate the capacity of the immunoglobulins immobilised on an inert support for food liquids decontamination from excess steroid hormones.

The experiment was carried out on milk as it contains said hormones in varying amounts depending on the physiological period of milking; by way of example, the possibility of removing progesterone from milk was examined.

The decontamination power of the following IgGs was examined:

a. anti-progesterone specific IgGs immobilised on magnetic microspheres coated with synthetic polymers, suitable for chemical conjugation;
b. anti-progesterone specific IgGs immobilised on nitrocellulose strips according to the procedure of the present invention.

The immobillisation of magnetic microspheres was performed according to the same procedure as used for the immobilisation on glass.

Milk decontamination was performed according to the following experimental procedure.

The progesterone content in milk was evaluated by ELISA, according to known procedures (J. A. Demetriou, in Meth. in Clin. Chem., 1987, p. 253, A. J. Pesce and L. A. Kaplan, Eds., C. V. Mosby Publisher, St. Louis, USA).

Once the progesterone content was checked, milk was subdivided into 10 l aliquots, which were treated as follows:

aliquot No. 1: use of IgGs immobilised on magnetised microspheres in such a concentration as to obtain a ratio of 1 mol IgG to 1 mol progesterone present, under gentle magnetic stirring, which imparts continuous movement to the microspheres;

aliquot No. 2: use of IgGs immobilised on nitrocellulose strips in such a concentration as to obtain a ratio of 1 mol IgG to 1 mol progesterone, under gentle stirring, which imparts slight movement to the cellulose strips in the liquid.

All decontamination experiments were carried out at room temperature.

After 1-h and 3-h contact, a 100 ml quantity was taken from each milk aliquot and the progesterone content in the liquid (non-sequestered) was determined.

The microspheres were removed by filtration and the cellulose strips were removed manually.

The following table shows the results obtained, under the aforesaid experimental conditions, expressed as percent abatement of the progesterone concentration in milk (decontamination power of anti-progesteone specific IgGs immobilised on various inert supports).

The results point out the decontamination efficiency of IgGs conjugated to fabrics other than nylon; e.g. nitrocellulose.

They also show that, by operating on large quantities, the immobilisation on fabric gives significantly better and more profitable results than the immobilisation on magnetised microspheres.

EXAMPLE 20

Fruit Juice Decontamination from Atrazine

The aim of the experiment was to analyse the capacity of specific IgGs immobilised on an inert phase for the decontamination of thick food liquids, such as fruit juices, from chemical decontaminants, such as for example atrazine.

To this end, anti-atrazine IgGs were immobilised on:

a. glass microspheres (Sigma-4643),
b. nylon fabric, according to the present invention.

Fruit juice decontamination was performed according to the following experimental procedure.

The atrazine content in fruit juices was evaluated by gas-chromatography according to common methods (H. M. Stahr, Analytical Methods in Toxicology, 1991, pag. 181, John Wiley and Sons, N.Y).

An orange juice as found in commerce was added extemporaneously with an atrazine solution up to a final concentration of 50 µg/l juice.

The juice was subdivided into 5 l aliquots, which were treated as follows:

aliquot No. 1: under stirring at 150 rpm, with addition of anti-atrazine specific IgGs immobilised on glass microspheres in a ratio of 2 mol IgG to 1 mol contaminant;

aliquot No. 2: under stirring at 150 rpm, with addition of anti-atrazine specific IgGs immobilised on nylon fabric according to the present invention in a ratio of 1 mol IgG to 1 mol contaminant;

aliquot No. 3 under stirring at 150 rpm, with addition of anti-atrazine specific IgGs immobilised on nylon fabric in a ratio of 2 mol IgG to 1 mol contaminant.

Like in all other experiments, the IgG activated nylon strips were resuspended in the liquid to be decontaminated by keeping same In suspension by means of hollow plastic balls at one end of the strip, and taut, during stirring, by means of small lead sinkers at the other end.

All decontamination experiments were carried out at room temperature.

After 2 and 4 hours, a 100 ml quantity was taken from each juice aliquot and the contaminant atrazine content in the liquid (non-sequestered—free) was determined.

The following table shows the results obtained, under the aforesaid experimental conditions, expressed as percent abatement of the free atrazine concentration in the fruit juice (specific IgGs decontamination capacity).

| Method | % progesterone abatement after | |
|---|---|---|
| | 1 h | 3 h |
| IgGs on magnetised microspheres | 74 | 88 |
| IgGs on nitrocellulose | 97 | 100 |

| Method | IgG:atrazine ratio by mol. | % atrazine abatement after: | |
|---|---|---|---|
| | | 2 h | 4 h |
| IgGs on glass microspheres | 2:1 | 45 | 60 |
| IgGs on nylon | 1:1 | 65 | 78 |
| IgGs on nylon | 2:1 | 87 | 95 |

These results show that also "thick" food liquids can be decontaminated, i.e. under the particular conditions of the antibody/substance to the eliminated reaction medium.

They also show that when, in the decontamination, the fabrics are used as an antibodies immobilisation means, the reaction conditions and consequently the decontamination capacity are significantly improved.

The invention claimed is:

1. Process for decontaminating a liquid food from one or more chemical and/or biological contaminants wherein one or more biocompatible polymer membranes to which antibodies specific for said contaminants are chemically conjugated through a linker, are immersed into said liquid, said one or more membranes being free to move in the liquid and being kept taut by floats at one end and by weights at the other end thereof.

2. The process according to claim 1, wherein the biocompatible polymer is selected from: nylon, cellulose, polyacrylate, polyester or viscose, their derivatives or mixture thereof.

3. The process according to claim 2, wherein said polymer is nylon.

4. The process according to claim 2, wherein said polymer is a non woven fabric.

5. The process according to claim 1, wherein the linker is selected from the group consisting of: $CH_2$—$CH_2$—$SO_2$—$CH_2$—$CH_2$—$NH$—$(CH_2)_4$—$N$=$CH$—$(CH_2)_3$—$CH$=$O$ or a peptide comprising a diamino-monocarboxylic amino acid or a monoamino-dicarboxylic amino acid.

6. The process according to claim 5, wherein the diamino monocarboxylic amino acid is chosen between arginine and lysine and the monoamino-dicarboxylic amino acid is chosen between glutamic acid and aspartic acid.

7. The process according to claim 1, wherein said contaminants are selected from the group consisting of: parasiticides, weed killers, pesticides, drugs and metabolites thereof, hormones and metabolites thereof, wine malolactic fermentation products, and toxins.

8. The process according to claim 7, wherein said contaminants are further selected from the group consisting of: atrazine, aflatoxin, ochratoxin, fumonisine, cadaverine, putresceine, urethane, progesterone and salmonella antigen.

9. The process according to claim 1, wherein said membranes are kept immersed in the liquid for a time from 1 to 24 hours.

10. The process according to claim 1, wherein said membranes are kept immersed in the liquid for a time from 1 to 6 hours.

11. The process according to claim 1, which is performed with stirring.

12. The process according to claim 1, wherein said food liquid is selected from the group consisting of: wine, milk, fruit juice, vegetable juice, beer and water.

13. The process according to claim 1, wherein said antibodies are polyclonal antibodies.

14. The process according to claim 1, wherein the total surface of the membrane/s for contaminant is such that the molar ratio of the immobilized antibody to the contaminant toward which the antibody is directed is $\geq 1$.

15. The process according to claim 14, wherein the said molar ratio is from 1 to 5.

16. The process according to claim 15, wherein said molar ratio is from 1 to 2.

17. The process according to claim 1, which is performed in a single operation.

\* \* \* \* \*

UNITED STATES PATENT AND TRADEMARK OFFICE
CERTIFICATE OF CORRECTION

PATENT NO. : 7,494,589 B2
APPLICATION NO. : 10/518106
DATED : February 24, 2009
INVENTOR(S) : Ivo Volpato et al.

It is certified that error appears in the above-identified patent and that said Letters Patent is hereby corrected as shown below:

Column 4, line 53, replace "5 x 10 mol" with --$5 \times 10^{-6}$ mol--

Column 4, line 56, replace ".HC1" with -- HCI--

Column 5, line 9, replace ".2 HC1" with -- 2HCI--

Column 8, line 67 after "by" delete "to"

Column 9, line 3, replace "mg/mil" with --mg/ml--

Column 18, line 44 replace "In" with --in--

Signed and Sealed this

Twenty-sixth Day of May, 2009

JOHN DOLL
*Acting Director of the United States Patent and Trademark Office*